Aug. 28, 1928.
F. W. SHAKESHAFT
1,682,310
COMBINATION GAUGE FOR MECHANICS
Filed May 22, 1926
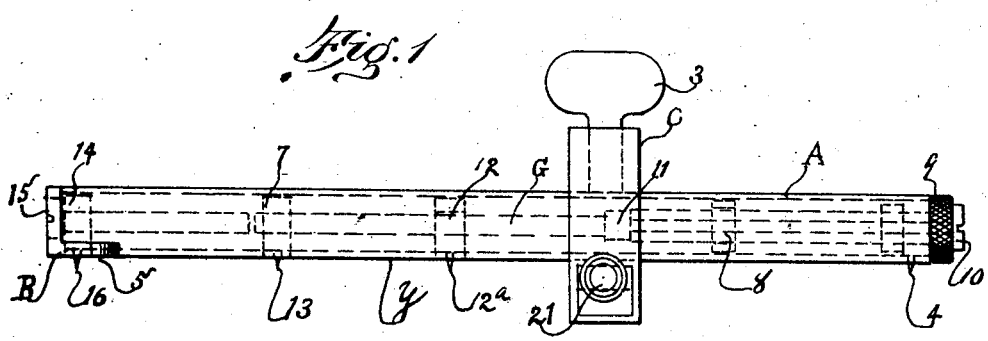
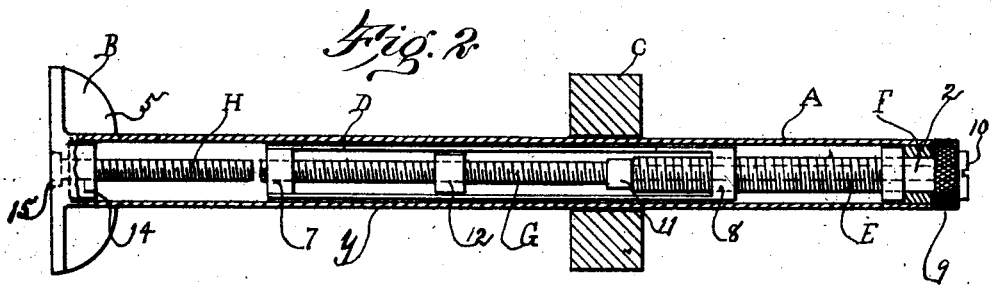
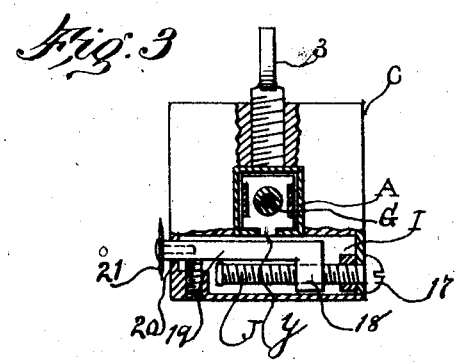
Frederick W. Shakeshaft
Inventor
By F. N. Gilbert
Attorney Patented Aug. 28, 1928.

1,682,310

UNITED STATES PATENT OFFICE.

FREDERICK W. SHAKESHAFT, OF ROCHESTER, NEW YORK.

COMBINATION GAUGE FOR MECHANICS.

Application filed May 22, 1926. Serial No. 110,887.

The object of my invention is to provide for mechanics a combination gauge which can be readily adjusted, and used for mortising, for cutting, and for marking several different widths or marking one or two widths and thereby eliminating the necessity for a plurality of tools for mechanical work in a mechanic's kit.

With these objects in view, my invention consists of the following novel features of construction and arrangement of parts as will be hereinafter more fully described in detail, and pointed out in the claims, reference being had to the accompanying drawings in which:

Fig. 1, is a side view of a combination gauge embodying my invention.

Fig. 2, is a side view in cross section of said gauge.

Fig. 3, is an end view partly in cross section of my device.

The same reference characters denote like parts in each of the several figures of the drawings.

In carrying out my invention, I provide a stock A, which stock is tubular and of metal, and its outer end closed by a plug 2, and on its inner end I have mounted a guide fence B; also mounted on stock A and adapted to horizontally slide thereon, I have an adjustable cylindrical fence C, which is provided with a set screw 3, and adjustably clamping the fence C to the stock A. On the under side of stock A, is elongated slot Y. On one side of the tubular stock A, and mounted in plug 2, near the outer end of stock, and in line with slot Y, I have a fixed projecting marking pin 4. Mounted within the stock A I have a sliding guide frame D, in one end of which is mounted a wall 7, and in the opposite end is mounted a wall 8. In the outer end of stock A, and passing through and rotatively mounted in plug 2 and horizontally extending within stock A, I have the hollow external spindle E, having a threaded outer surface which spindle E passes thru a threaded opening wall 8, and has threaded connection therewith. On the outer end of internal spindle E, I have a thumb nut 9.

As a further part of my device and rotatively within the hollow internal spindle E, I have a second internal spindle F having on its outer end the screw head 10. This internal spindle F has a threaded extension spindle (G), on which is mounted a nut head 11. The extension spindle G is horizontally mounted within stock A, and its inner end passing thru and supported by and having slidable connection with wall 7 in guide frame D. Mounted on internal spindle G and having threaded connection therewith and adapted to move lengthwise within the stock A, I have the cylindrical nut 12. Swivelled in the outer end of stock A and in fence B, and extending horizontally into stock A, I have the rotatable spindle H, which has at its outer end a screw head 15, which is mounted in the head plate of fence B, and mounted on spindle H, and having threaded connection therewith I have the nut 14, adapted to move horizontally in stock A when the spindle H is rotated. On one side of the tubular stock A, I have an elongated slot Y. Mounted in cylindrical nut 12 and projecting thru slot Y, I have a marking pin 12ª, and mounted in wall 7 of guide frame D, and projecting thru slot Y, I have the projecting pin 13, and mounted in the cylindrical nut 14 and projecting thru slot Y, in stock A, I have the marking pin 16.

As a further part of my device, transversely alined in fence C, I have a hollow chamber I, and rotatably mounted within the chamber I, I have a horizontally disposed threaded spindle J, which has on its outer end the screw head 17. Mounted on the spindle J in chamber (I), I have the nut 18 provided with a projecting arm 19 adapted to move horizontally in chamber (I), when the spindle (J) is rotated. The arm 19 projects and slides through an opening 20 in the wall of chamber I, and mounted on the end of arm 19, I have a small marking disk 21.

In using the device, the fence (C) may be adjusted to any desired position, and be locked in place by the thumb screw 3. Then the device may be drawn along a work-piece to place a line on the latter by means of a marker 4, or the fence may be secured in any suitable position and the markers 16, 13 and 12ª may be used to mark three parallel lines on the work-piece.

To adjust the marker 16, it is only necessary to turn the screw head 15 which will cause the nut 14 to move along the threaded spindle (H).

By turning the screw head 10, the threaded spindle (G) will rotate and feed the screw 12 which carries the marker 12ª.

When the part 9 is rotated, the outer threaded spindle (E) which engages the threaded end 8 of the frame (D), will cause said frame and the marker 13, which it carries, to travel to the desired position.

When the marker 21 is to be used, it may be adjusted to the desired position by turning the screw head 17. This causes the threaded spindle (G) to move the parts 18 and 19.

Having thus described my invention what I claim as new, and for which I desire to secure Letters Patent is as follows:

1. A combination gauge consisting of a slotted tubular stock having a marking point mounted thereon, a carrying frame longitudinally mounted within said stock, an adjustable point mounted on said carrying frame and projecting through the slot in the stock, an outer threaded spindle working within the tubular stock and having threaded connection with one end of the carrying frame, an inner spindle passing through and capable of rotation within the outer spindle, and having a threaded extension projecting beyond the outer spindle, the outer end of the inner spindle rotating within an end wall of the carrying frame, a cylindrical nut mounted on the inner spindle and having a marker thereon projecting through the slot in the stock, a marker upon the end wall of the tubular stock, and projecting through the slotted opening of the stock, a fence adjustably mounted on the stock, an arm slidably and adjustably mounted in the fence, transversely to the stock, and a marking disk pivotally mounted on the end of said arm.

2. A combination gauge comprising a slotted tubular stock having a marking point mounted thereon, a carrying frame slidably mounted in the tubular stock, an outer threaded spindle arranged longitudinally of the stock and having threaded engagement with said frame for sliding the frame when the spindle is rotated, means for rotating the spindle from the exterior of the stock, an inner threaded spindle extending through the outer spindle and provided with means arranged exteriorly of the stock for causing the inner spindle to be rotated, a nut in the stock in threaded engagement with the inner spindle, and markers on said frame and nut, projecting through the slot of the stock and adapted to be moved relatively to each other when either spindle is turned.

3. A combination gauge as claimed in claim 2, including a third threaded spindle, a nut in threaded engagement with the third spindle, and a marker on the last mentioned nut projecting through said slot.

4. In a combination gauge, a stock, a fence transversely arranged and slidable on the stock, a threaded spindle swivelled in the fence and arranged transversely of the stock, a substantially L-shaped bar slidable transversely in the fence and having a threaded aperture through which the spindle projects, and a marking disk arranged at the outer end of said bar.

In testimony whereof I have affixed my signature.

FREDERICK W. SHAKESHAFT.